US009172450B2

(12) United States Patent
Qin et al.

(10) Patent No.: US 9,172,450 B2
(45) Date of Patent: Oct. 27, 2015

(54) PROCESSING METHOD AND DEVICE FOR PERFORMING SPACE-TIME DECODING ON MIMO SIGNAL

(71) Applicant: ZTE CORPORATION, Shenzhen City, Guangdong Province (CN)

(72) Inventors: Hongfeng Qin, Shenzhen (CN); Gaocai Xiong, Shenzhen (CN); Yue Xiao, Shenzhen (CN); Hongzhi Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/406,021

(22) PCT Filed: Aug. 20, 2013

(86) PCT No.: PCT/CN2013/081860
§ 371 (c)(1),
(2) Date: Dec. 5, 2014

(87) PCT Pub. No.: WO2013/189383
PCT Pub. Date: Dec. 27, 2013

(65) Prior Publication Data
US 2015/0155924 A1 Jun. 4, 2015

(30) Foreign Application Priority Data
Aug. 20, 2012 (CN) .......................... 2012 1 0295683

(51) Int. Cl.
*H04B 7/02* (2006.01)
*H04B 7/04* (2006.01)
(52) U.S. Cl.
CPC .................................. *H04B 7/0478* (2013.01)
(58) Field of Classification Search
CPC .................... H04L 1/0631; H04L 1/06; H04L 2025/03426; H04L 25/03242

USPC .......................................................... 375/267
See application file for complete search history.

(56) References Cited

U.S. PATENT DOCUMENTS

| 2005/0135498 A1* | 6/2005 | Yee ................................ 375/267 |
| 2006/0056550 A1* | 3/2006 | Skraparlis et al. ............. 375/347 |
| 2014/0062733 A1* | 3/2014 | Chrabieh et al. .............. 341/107 |

FOREIGN PATENT DOCUMENTS

| CN | 101316155 A | 12/2008 |
| WO | WO2011/039644 A2 | 4/2011 |

OTHER PUBLICATIONS

Li, Min et al,; Optimizating Near-ML MIMO Detector for SDR Baseband on Parallel Programmable Architectures. Design, Automation and Test in Europe, 2008.Mar. 10-14, 2008.

*Primary Examiner* — Don N Vo
(74) *Attorney, Agent, or Firm* — Ling Wu; Stephen Yang; Ling and Yang Intellectual Property

(57) ABSTRACT

Provided is a processing method and apparatus for performing space-time decoding on MIMO signals. The method includes: performing QR decomposition on a channel matrix H with a size of $N_r \times N_t$ in a MIMO system and performing an initialization operation, wherein $N_t$ is the number of transmitting antennas and $N_r$ is the number of receiving antennas; enumerating candidate constellation points of transmitting signals at each level of transmitting antennas according to an input parameter $M=[M_1, M_2, \ldots, M_{N_t}]$, a receiving signal y and a result of QR decomposition of H, wherein M is the number of the numerated candidate constellation points at each level, $y=Hs+n$; calculating increments of a Euclid distance due to addition of selection of a candidate constellation point at present level according to obtained candidate constellation points; and deciding and outputting space-time decoding according to the sum of calculated increments of Euclid distances of candidate constellation points at all levels.

20 Claims, 6 Drawing Sheets

PROCESSING METHOD AND DEVICE FOR PERFORMING SPACE-TIME DECODING ON MIMO SIGNAL

TECHNICAL FIELD

The present document relates to the field of communication signal detection, and more particularly, to a processing method and apparatus for performing space-time decoding on MIMO signals.

BACKGROUND OF THE RELATED ART

In related arts, the transmission rate of a system can increase linearly with the number of antennas by a multiple-antenna spatial multiplexing technology. Although the increase in the number of antennas can improve the rate of the system significantly, it increases greatly the complexity of algorithm of a receiver. For example, the complexity of a max likelihood (referred to as "ML") detection algorithm with the optimal detection performance grows exponentially with the increase in the number of transmitting antennas, which makes it difficult to be used in practical application.

At present, multiple-input multiple-output (referred to as MIMO) detection algorithm has been studied widely. More typical algorithms include two types: one is linear detection algorithm focused on zero forcing (referred to as ZF), minimum mean square error (referred to as MMSE) and variants thereof; the other is non-linear algorithm focused on vertical-bell laboratories layered space-time (referred to as V-BLAST), class ML and variants thereof. Although the linear algorithm has lower complexity, it has error propagation characteristics in making a detection, which makes its performance very poor in the case of low signal-noise ratio. The V-BLAST algorithm achieves certain performance improvement over the linear algorithm, however, its complexity increases accordingly. Compared with the linear algorithm and the V-BLAST algorithm, the ML algorithm has higher complexity, but it can improve system performance significantly. More important, the ML algorithm can maintain excellent performance even in the case of relatively lower signal-noise ratio, which undoubtedly has great attraction to wireless communication systems.

In order to resolve the high complexity problem of the ML algorithm, many simplified algorithms which can decrease the complexity of the algorithm on the premise of less performance sacrifice have been proposed. More typical algorithms include sphere decoding, K-Best algorithm and variants thereof. The main disadvantages of these algorithms include that: 1) Serial operation has too many cyclic search instructions, which can improve power consumption and processing delay of programmable devices significantly and goes against real-time processing of signals; 2) The calculation complexity of the traditional algorithm is too high and its execution process relies on dynamic skip, which will decrease resource utilization rate of programmable devices greatly; 3) The incorrect constellation points searched by the previous level of antenna will effect the search of constellation points in the next level, thereby generating error propagation.

The selective spanning with fast enumeration (referred to as SSFE) which is a space-time decoding method will be explained emphatically. In the SSFE scheme, candidate constellation points at each level are chosen by selective fast enumeration method.

Specifically, in the MIMO system, assuming $N_t$ transmitting antennas and $N_r$ receiving antennas, a M-QAM modulation mode is used. A receiving signal y can be represented as y=Hs+n, wherein H is a channel matrix with a matrix size of $N_r \times N_t$, s is a transmitting signal with a matrix size of $N_t \times 1$, n is white gaussian noise with a matrix size of $N_r \times 1$.

H=Q×R can be obtained by QR decomposition of channel matrix H.

Multiplying the receiving vector y by a Hermitian transpose of a matrix Q after the QR decomposition of the channel matrix H, i.e., $\hat{y}=Q^H y$, wherein $Q^H$ represents Hermitian conjugate of the matrix Q.

An increment $\|e\|$ of Euclid distance of a symbol $s_j$ estimated by $i^{th}$ transmitting antenna is defined as $$\|e(s_i)\|^2 = \left\| \hat{y}_i - \sum_{j=i}^{N_t} R_{ij} s_j \right\|,$$

wherein $s_j$ represents the detected transmitting signal of the $j^{th}$ transmitting antennas, $R_{ij}$ represents the element in the ith row and the jth column of a matrix R, and $\hat{y}_i$ represents the $i^{th}$ element of the vector $\hat{y}$.

It can be seen from above that the SSFE technology provides a better space-time decoding idea and method. However, in actual situations, it is not good as the model. There are following problems in the SSFE technology in making fast enumeration: 1) When the selective fast enumeration of constellation points are performed, the results obtained by this approach exceed the scope of a constellation drawing when the constellation points of signals to be detected are located on the edge of the constellation drawing; 2) Because the determination of constellation points at the next level depends on the constellation points obtained at the previous level, all results obtained after this branch are erroneous as long as one result exceeds the scope of the constellation drawing.

SUMMARY OF THE INVENTION

Embodiments of the present document provide a processing method and apparatus for performing space-time decoding on MIMO signals so as to resolve the problems existing in the SSFE algorithm when making fast enumeration in related arts.

An embodiment of the present document provides a processing method for performing space-time decoding on MIMO signals comprising:

step 1, performing QR decomposition on a channel matrix H with a matrix size of $N_r \times N_t$ in a MIMO system and performing an initialization operation, wherein $N_t$ is the number of transmitting antennas and $N_r$ is the number of receiving antennas;

step 2, enumerating candidate constellation points of transmitting signals at each level of transmitting antennas according to an input parameter $M=[M_1, M_2, \ldots, M_{N_t}]$, a receiving signal y and a result of the QR decomposition of the channel matrix H, wherein M is the number of the enumerated candidate constellation points at each level, the receiving signal is y=Hs+n, wherein H is the channel matrix with the matrix size of $N_r \times N_t$, s is a transmitting signal with a matrix size of $N_t \times 1$, n is white gaussian noise with a matrix size of $N_r \times 1$;

step 3, calculating increment of a Euclid distance due to addition of selection of candidate constellation points at present level according to the obtained candidate constellation points; and step 4, deciding and outputting space-time decoding according to the sum of the calculated increments of Euclid distances of candidate constellation points at each level.

Optionally, the step 1 comprises:

step 11, performing QR decomposition on the channel matrix H according to formula 1:

$$H = Q \times R \quad \text{formula 1,}$$

wherein Q represents an orthogonal matrix after the QR decomposition of the channel matrix H and R represents an upper triangular matrix after the QR decomposition of the channel matrix H;

step 12, multiplying a receiving signal y by a Hermitian transpose of the matrix Q after the QR decomposition of the channel matrix H, i.e., $\hat{y} = Q^H y$, wherein $Q^H$ represents Hermitian conjugate of the matrix Q; and Step 13, setting $i = N_t$.

Optionally, the step 2 comprises:

step 21, calculating directly restored data of transmitting signals of the $i(1, 2, \ldots, N_t)^{th}$ transmitting antenna according to formula 2:

$$\xi_i = \frac{\hat{y}_i - \sum_{j=i+1}^{N_t} R_{ij} s_j}{R_{ii}}, \quad \text{formula 2}$$

wherein $\hat{y}_i$ represents the $i^{th}$ element of the vector $\hat{y}$, $R_{ij}$ represents data in the $i^{th}$ row and the $j^{th}$ column of the matrix R after the QR decomposition of the channel matrix H, and $s_j$ represents the detected transmitting signal of the $j^{th}$ transmitting antenna;

step 22, calculating a distance of the restored data from the nearest candidate constellation point according to formula 3:

$$d = \xi_i - Q(\xi_i) \quad \text{formula 3,}$$

wherein $Q(\xi_i)$ represents performing a hard decision for $\xi_i$;

step 23, calculating an auxiliary variable $\phi$ according to formula 4:

$$\phi = |\Re(d)| > |\Im(d)| \quad \text{formula 4,}$$

wherein $\Re()$ represents taking real part operation, and $\Im()$ represents taking imaginary part operation;

step 24, calculating the number $Rn_i = \text{ceil}(\text{sqrt}(M_i))$ of points of the required real parts and the number $In_i = \text{ceil}(\text{sqrt}(M_i))$ of points of the required imaginary parts;

step 25, calculating the number $Rn_i$ of the nearest points from $\Re(\xi_i)$ in a set $\Re$ set and calculating the number $In_i$ of the nearest points from $\Im(\xi_i)$ in a set $\Im$ set, wherein $\Re$ set is a set of values of the real parts of the candidate constellation points and $\Im$ set is a set of values of the imaginary parts of the candidate constellation points; and step 25, calculating the candidate constellation points $p_i(1, 2, \ldots, M_i)$ at each level of transmitting antennas according to a principle of gradual increase of the Euclid distance and according to $Rn_i$, $In_i$ and the auxiliary variable $\phi$.

Optionally, the step 3 comprises:

step 31, setting $s_i$ to be respectively equal to each point in the candidate constellation points $p_i(1, 2, \ldots, M_i)$ detected by the $i^{th}$ transmitting antenna, and calculating Euclid distances under $M_i$ different paths according to formula 5:

$$\|e(s_i)\|^2 = \left\|\hat{y}_i - \sum_{j=i}^{N_t} R_{ij} s_j\right\|^2; \quad \text{formula 5}$$

and step 32, determining whether i equals 1, and if yes, performing the step 4; if not, setting $i = i - 1$ and performing the step 21.

Optionally, the step 4 comprises:

step 41, determining whether a hard decision mode or a soft decision mode is used, performing the step 42 if the hard decision mode is determined to be used and performing the step 43 if the soft decision mode is determined to be used;

step 42, selecting directly a path that minimizes $$\sum_{i=1}^{N_t} \|e(s_i)\|^2$$

as a decision output; and step 43, performing log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and using a result of the calculation as the decision output.

Optionally, the transmitting signals are modulated by using a mode of multi-level Quadrature Amplitude Modulation (M-QAM).

An embodiment of the present document further provides a processing apparatus for performing space-time decoding on MIMO signals comprising:

a QR decomposition module configured to perform QR decomposition on a channel matrix H with a matrix size of $N_r \times N_t$ in a MIMO system and perform an initialization operation, wherein $N_t$ is the number of transmitting antennas and $N_r$ is the number of receiving antennas;

a candidate constellation point calculation module configured to enumerate candidate constellation points of transmitting signals at each level of transmitting antennas according to an input parameter $M = [M_1, M_2, \ldots, M_{N_t}]$, a receiving signal y and a result of the QR decomposition of the channel matrix H, wherein M is the number of the enumerated candidate constellation points at each level, the receiving signal is $y = Hs + n$, wherein H is the channel matrix with the matrix size of $N_r \times N_t$, s is a transmitting signal with a matrix size of $N_t \times 1$, n is white gaussian noise with a matrix size of $N_r \times 1$;

a Euclid increment calculation module configured to calculate increment of a Euclid distance due to addition of selection of a candidate constellation point at present level according to the obtained candidate constellation points; and an output module configured to decide and output space-time decoding according to the sum of the calculated increments of Euclid distances of candidate constellation points at each level.

Optionally, the QR decomposition module is configured to:

perform QR decomposition on the channel matrix H according to formula 6:

$$H = Q \times R \quad \text{formula 6,}$$

wherein Q represents an orthogonal matrix after the QR decomposition of the channel matrix H and R represents an upper triangular matrix after the QR decomposition of the channel matrix H;

multiply a receiving signal y by a Hermitian transpose of the matrix Q after the QR decomposition of the channel matrix H, i.e., $\hat{y} = Q^H y$, wherein $Q^H$ represents Hermitian conjugate of the matrix Q; and set $i = N_t$.

Optionally, the candidate constellation point calculation module is configured to:

calculate directly restored data of transmitting signals of the $i(1, 2, \ldots, N_t)^{th}$ transmitting antenna according to formula 7:

$$\xi_i = \frac{\hat{y}_i - \sum_{j=i+1}^{N_t} R_{ij} s_j}{R_{ii}}, \quad \text{formula 7}$$

wherein $\hat{y}_i$ represents the $i^{th}$ element of the vector $\hat{y}$, $R_{ij}$ represents data in the $i^{th}$ row and the $j^{th}$ column of the matrix R after the QR decomposition of the channel matrix H, and $s_j$ represents the detected transmitting signal of the $j^{th}$ transmitting antenna;

calculate a distance of the restored data from the nearest candidate constellation point according to formula 8:

$$d = \xi_i - Q(\xi_i) \quad \text{formula 8,}$$

wherein $Q(\xi_i)$ represents performing a hard decision for $\xi_i$;

calculate an auxiliary variable $\phi$ according to formula 9:

$$\phi = |\Re(d)| > |\Im(d)| \quad \text{formula 9,}$$

wherein $\Re( )$ represents taking real part operation, and $\Im( )$ represents taking imaginary part operation; and calculate the number $Rn_i = \text{ceil}(\text{sqrt}(M_i))$ of points of the required real parts and the number $In_i = \text{ceil}(\text{sqrt}(M_i))$ of points of the required imaginary parts;

calculate the number $Rn_i$ of the nearest points from $\Re(\xi_i)$ in a set $\Re$ set and calculating the number $In_i$ of the nearest points from $\Im(\xi_i)$ in a set $\Im$ set, wherein $\Re$ set is a set of values of the real parts of the candidate constellation points and $\Im$ set is a set of values of the imaginary parts of the candidate constellation points; and calculate the candidate constellation points $p_i(1, 2, \ldots, M_i)$ at each level of transmitting antennas according to a principle of gradual increase of the Euclid distance and according to $Rn_i$, $In_i$ and the auxiliary variable $\phi$.

Optionally, the Euclid increment calculation module is configured to:

set $s_i$ to be respectively equal to each point in the candidate constellation points $p_i(1, 2, \ldots, M_i)$ detected by the $i^{th}$ transmitting antenna, and calculate Euclid distances under $M_i$ different paths according to formula 10:

$$\|e(s_i)\|^2 = \left\| \hat{y}_i - \sum_{j=i}^{N_t} R_{ij} s_j \right\|^2 ; \quad \text{formula 10}$$

and determine whether i equals 1, and if yes, invoke the output module; if not, set $i = i-1$ and invoke the candidate constellation point calculation module.

Optionally, the output module comprises:

a determining sub-module configured to determine whether a hard decision mode or a soft decision mode is used, invoke a hard decision outputting sub-module if the hard decision mode is determined to be used and invoke a log-likelihood ratio calculation sub-module if the soft decision mode is determined to be used;

the hard decision outputting sub-module configured to select directly a path that minimizes $$\sum_{i=1}^{N_t} \|e(s_i)\|^2$$

as a decision output; and the log-likelihood ratio calculation sub-module configured to perform a log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and use a result of the calculation as the decision output.

Optionally, the transmitting signals are modulated by using a mode of multi-level Quadrature Amplitude Modulation (M-QAM).

Beneficial effects of the embodiments of the present document is as follow:

by setting the vector $M = [M_1, M_2, \ldots, M_{N_t}]$, the number of the constellation points reserved by each level of transmitting antennas is fixed, and the process of selecting the constellation points of the transmitting antennas does not include the selection-decision process such as if-then. Therefore, processing delay of each path is consistent and is suitable for parallel calculation. The process of selecting the constellation points of each transmitting antenna of the embodiments of the present document is performed only by simple operations such as looking for the nearest points from the real parts and imaginary parts, enumerating, etc., therefore the complexity of calculation is very low. Compared with the SSFE algorithm, values of the real parts and imaginary parts are not required to be calculated during the enumeration process, further decreasing the amount of calculation. In addition, all the constellation points enumerated in the embodiments of the present document are located inside the constellation drawing, avoiding the phenomenon of the enumerated points exceeding the constellation which may occur in the SSFE algorithm. The technology scheme of the embodiments of the present document reduces error propagation and improves detection performance.

PREFERRED EMBODIMENTS OF THE PRESENT DOCUMENT

In order to resolve the problems existing in the SSFE algorithm when making fast enumeration in related arts, embodiments of the present document provide a processing method and apparatus for performing space-time decoding on MIMO signals, i.e., a new selective spanning with fast enumeration (referred to as NSSFE). This scheme has utilized the idea of a part of the SSFE technology and well resolved the problems existing in the SSFE algorithm when making fast enumeration. The embodiments of the present document will be described in further detail in conjunction with the accompanying drawings and embodiments. It should be understood that the embodiments described herein are intended to explain the embodiments of the present document only and not to limit the embodiments of the present document.

Method Embodiment

Figure 1:
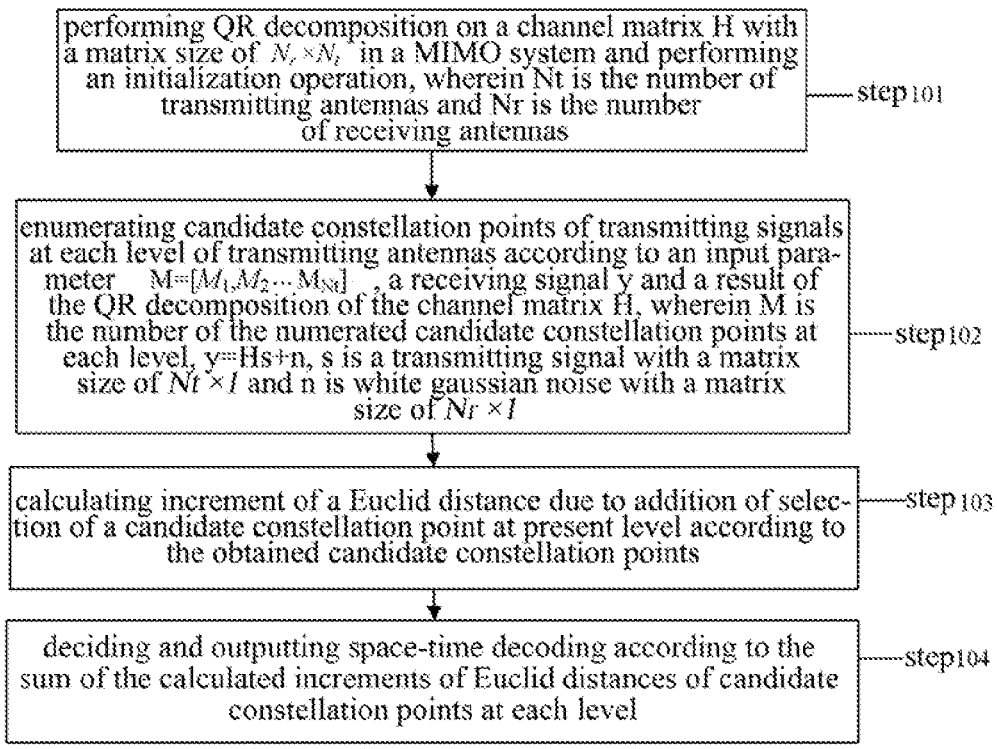
FIG. 1 is a flow chart of a processing method for performing space-time decoding on MIMO signals in accordance with an embodiment of the present document.

According to an embodiment of the present document, a processing method for performing space-time decoding on MIMO signals is provided. FIG. 1 is a flow chart of the processing method for performing space-time decoding on MIMO signals in accordance with the embodiment of the present document. As shown in FIG. 1, the processing method for performing space-time decoding on MIMO signals in accordance with the embodiment of the present document comprises the follow step:

step 101, performing QR decomposition on a channel matrix H with a matrix size of $N_r \times N_t$ in a MIMO system and performing an initialization operation, wherein $N_t$ is the number of transmitting antennas and $N_r$ is the number of receiving antennas.

The step 101 is a pre-processing step which is required to perform the following operations:

step 1011, performing QR decomposition on the channel matrix H according to formula 1:

$$H = Q \times R \quad \text{formula 1,}$$

wherein Q represents an orthogonal matrix after the QR decomposition of the channel matrix H and R represents an upper triangular matrix after the QR decomposition of the channel matrix H;

step 1012, multiplying a receiving signal y by a Hermitian transpose of the matrix Q after the QR decomposition of the channel matrix H, i.e., $\hat{y} = Q^H y$, wherein $Q^H$ represents Hermitian conjugate of the matrix Q; and step 1013, setting $i = N_t$.

The method further comprises the follow step:

step 102, enumerating candidate constellation points of transmitting signals at each level of transmitting antennas according to an input parameter $M = [M_1, M_2, \ldots, M_{N_t}]$, a receiving signal y and a result of the QR decomposition of the channel matrix H, wherein M is the number of the numerated constellation points at each level, the receiving signal is $y = Hs + n$, wherein H is the channel matrix with the matrix size of $N_r \times N_t$, s is a transmitting signal with a matrix size of $N_t \times 1$, n is white gaussian noise with a matrix size of $N_r \times 1$.

The step 102 comprises the following steps:

Step 1021, calculating the directly restored data of transmitting signals of the $i(1, 2, \ldots, N_t)^{th}$ transmitting antenna according to formula 2:

$$\xi_i = \frac{\hat{y}_i - \sum_{j=i+1}^{N_t} R_{ij} s_j}{R_{ii}}, \quad \text{formula 2}$$

wherein $\hat{y}_i$ represents the $i^{th}$ element of the vector $\hat{y}$, $R_{ij}$ represents data in the $i^{th}$ row and the $j^{th}$ column of the matrix R after the QR decomposition of the channel matrix H, and $s_j$ represents the detected transmitting signal of the $j^{th}$ transmitting antenna;

step 1022, calculating a distance of the restored data from the nearest candidate constellation point according to formula 3:

$$d = \xi_i - Q(\xi_i) \quad \text{formula 3,}$$

wherein $Q(\xi_i)$ represents performing a hard decision for $\xi_i$;

step 1023, calculating an auxiliary variable $\phi$ according to formula 4:

$$\phi = |\Re(d)| > |\Im(d)| \quad \text{formula 4,}$$

wherein $\Re(\ )$ represents taking real part operation, and $\Im(\ )$ represents taking imaginary part operation;

step 1024, calculating the number $Rn_i = \text{ceil}(\text{sqrt}(M_i))$ of points of the required real parts and the number $In_i = \text{ceil}(\text{sqrt}(M_i))$ of points of the required imaginary parts;

step 1025, calculating the number $Rn_i$ of the nearest points from $\Re(\xi_i)$ in a set $\Re$ set and calculating the number $In_i$ of the nearest points from $\Re(\xi_i)$ in a set $\Re$ set, wherein $\Re$ set is a set of values of the real parts of the candidate constellation points and $\mathfrak{R}$ set is a set of values of the imaginary parts of the candidate constellation points; that is, in the M-QAM modulation, the sets of values of the real parts and imaginary parts of constellation points are respectively set as $\mathfrak{R}$ set and $\mathfrak{I}$ set;

step 1025, calculating the candidate constellation points $p_i(1, 2, \ldots, M_i)$ at each level of transmitting antennas according to a principle of gradual increase of the Euclid distance and according to $Rn_i$, $In_i$ and the auxiliary variable $\phi$.

Figure 2:
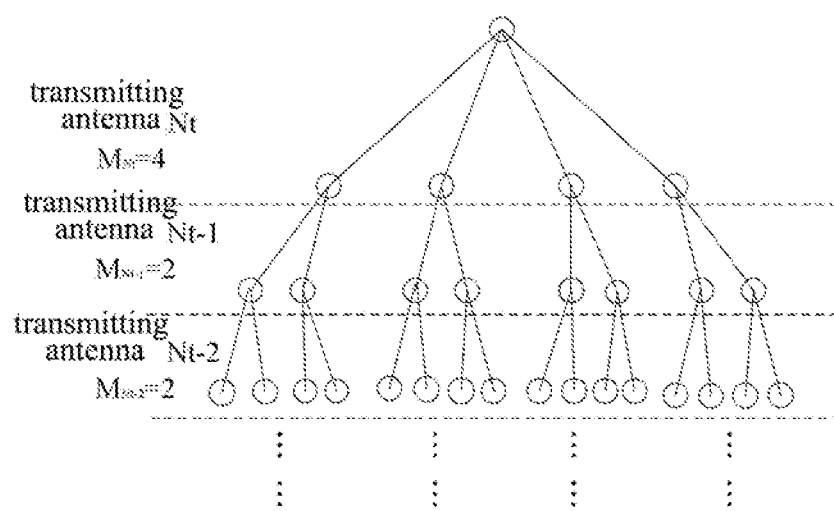
FIG. 2 is a schematic diagram of search of overall candidate constellation points in accordance with an embodiment of the present document.

FIG. 2 is a schematic diagram of search of overall candidate constellation points in accordance with an embodiment of the present document. As shown in FIG. 2, assuming that there are $N_t$ transmitting antennas, the search is started from the $N_t^{th}$ transmitting antennas, one vector $M=[M_1, M_1, \ldots, M_{N_t}]$ is set, and only $M_i$ most possible constellation points are reserved by the $i^{th}$ transmitting antenna.

The method comprises the following step:

step 103, calculating increments of a Euclid distance due to addition of selection of a candidate constellation point at present level according to the obtained candidate constellation points.

The step 103 comprises the following steps:

step 1031, setting $s_i$ to be respectively equal to each point in the candidate constellation points $p_i(1, 2, \ldots, M_i)$ detected by the $i^{th}$ transmitting antenna, and calculating Euclid distances under $M_i$ different paths according to formula 5:

$$\|e(s_i)\|^2 = \left\| \hat{y}_i - \sum_{j=i}^{N_t} R_{ij} s_j \right\|^2 ; \qquad \text{formula 5}$$

and step 1032, determining whether i equals 1, and if yes, performing the step 104; if not, setting i=i−1 and performing the step 1021. The calculation is performed for each newly added branch.

Figure 3:
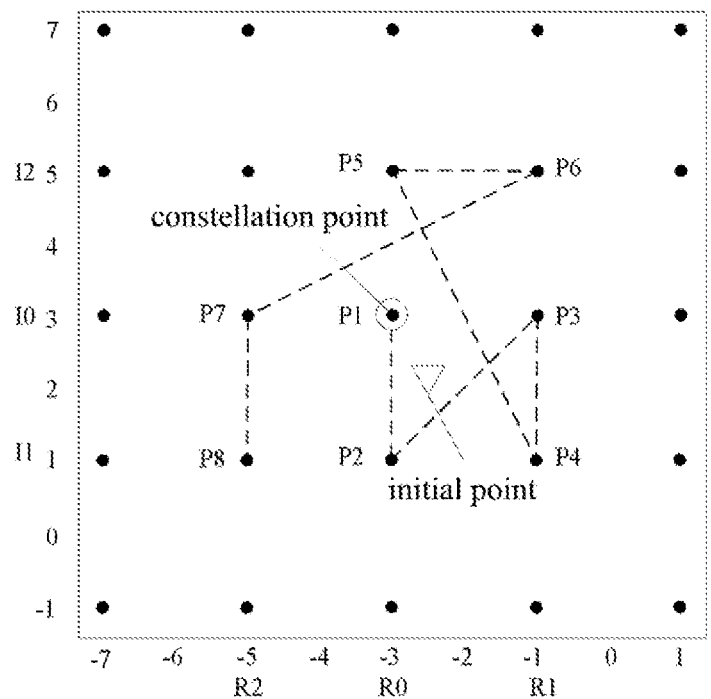
FIG. 3 is a schematic diagram of fast enumeration when the constellation points of each transmitting antenna are far away from the edge of a constellation drawing in step 103 in accordance with an embodiment of the present document.

FIG. 3 is a schematic diagram of fast enumeration when the constellation points of each transmitting antenna are far away from the edge of a constellation drawing in step 103 in accordance with an embodiment of the present document. As shown in FIG. 3, under 64QAM, when $\epsilon_i=2.7+2.2j$, the search results obtained by the fast enumeration algorithm of the embodiment of the present document are $p_1=-3+3j$; $p_2=-3+1j$; $p_3=-1+3j$; $p_4=-1+1j$; $p_5=-3+5j$; $p_6=-1+5j$; $p_7=-5+3j$; $p_8$ 5+1j.

Figure 4:
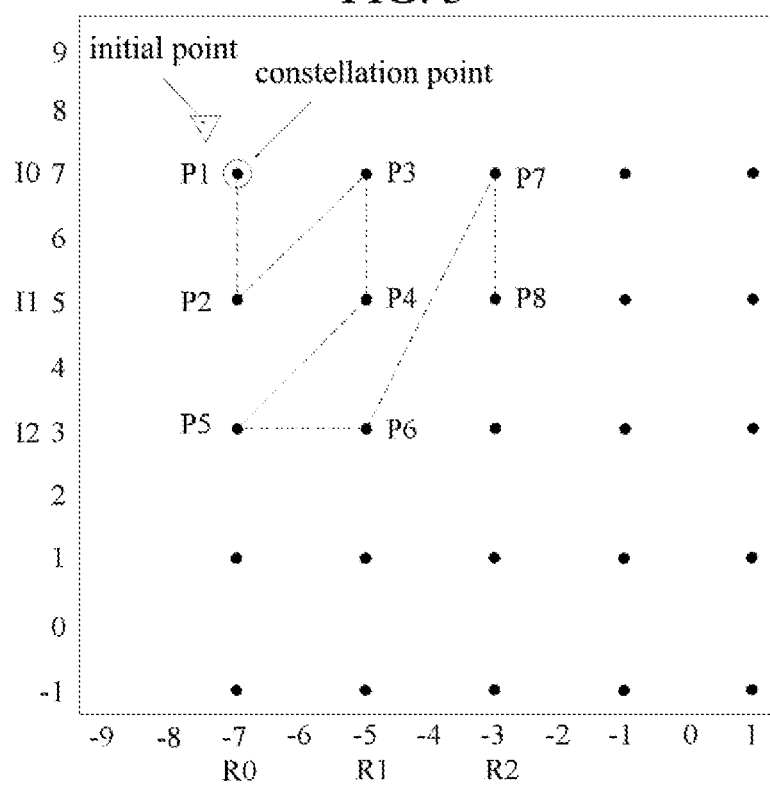
FIG. 4 is a schematic diagram of fast enumeration when the constellation points of each transmitting antenna are on the edge of the constellation drawing in step 103 in accordance with an embodiment of the present document.

FIG. 4 is a schematic diagram of fast enumeration when the constellation points of each transmitting antenna are on the edge of the constellation drawing in step 103 in accordance with an embodiment of the present document. As shown in FIG. 4, under 64QAM, when $\epsilon_i=-7.2+7.5j$, the search results obtained by the fast enumeration algorithm of the embodiment of the present document are $p_1=-7+7j$; $p_2=-7+5j$; $p_3=-5+7j$; $p_4=-5+5j$; $p_5=-7+3j$; $p_6=-5+3j$; $p_7=-3+7j$; $p_8=-3+5j$.

The method comprises the following steps:

step 104, deciding and outputting space-time decoding according to the sum of the calculated increments of Euclid distances of candidate constellation points at each level;

step 1041, determining whether a hard decision mode or a soft decision mode is used, performing the step 1042 if the hard decision mode is determined to be used and performing the step 1043 if the soft decision mode is determined to be used;

step 1042, selecting directly a path that minimizes $$\sum_{i=1}^{N_t} \|e(s_i)\|^2$$

as a decision output; and step 1043, performing log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and using the result of the calculation as the decision output.

The technical scheme of the embodiments of the present document will be described in detail in conjunction with the accompanying drawings.

Figure 5:
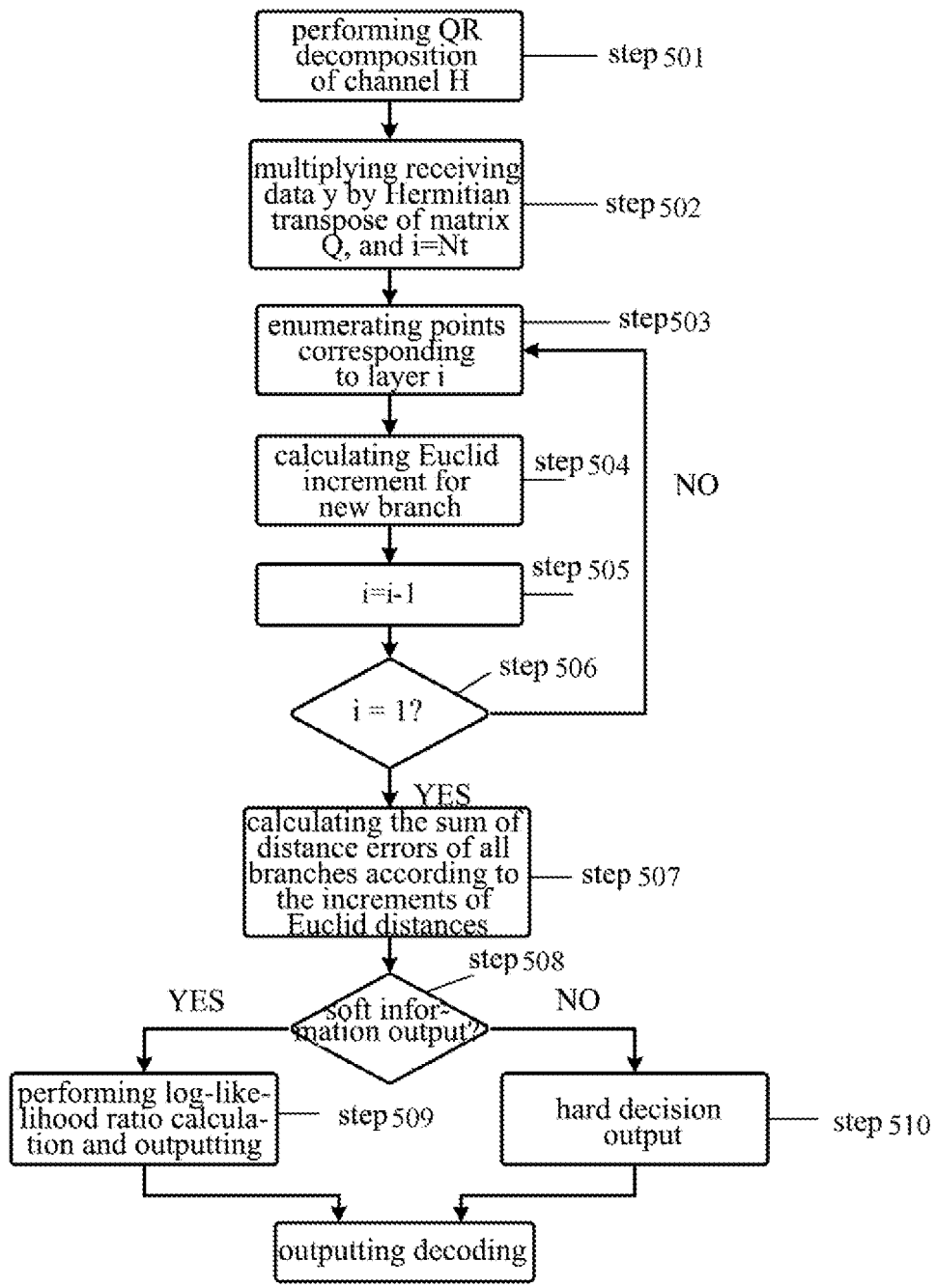
FIG. 5 is a detailed flow chart of a processing method for performing space-time decoding on MIMO signals in accordance with an embodiment of the present document.

FIG. 5 is a detailed flow chart of a processing method for performing space-time decoding on MIMO signals in accordance with an embodiment of the present document. As shown in FIG. 5, the method comprises the following step:

step 501, performing QR decomposition on a time domain channel matrix H: $H=Q \times R$;

The process of the QR decomposition of the channel matrix H is as follows:

1. The channel matrix H can be expressed as $H=[h_1 \ h_2 \ L \ h_m]$, wherein $m=N_t$, various column vectors are not correlated and can be orthogonalized.

2. The column vector $h_1$ is orthogonalized and a unit orthogonalized vector $q_1$ is calculated, $$q_1 = h_1 / |h_1|,$$

wherein |·| means taking an absolute value, to obtain the orthogonalized vector of $h_1$, $y_1=h_1=|h_1|\cdot q_1$.

3. The column vector $h_2$ is orthogonalized and a unit orthogonalized vector $q_2$ is calculated, $$q_2 = \frac{h_2 + k_{21} q_1}{|h_2 + k_{21} q_1|}, k_{21} = -\langle h_2, q_1 \rangle,$$

wherein $k_{nj}$ represents the projection of $h_n$ on $q_j$, $k_{21}$ represents the projection of $h_2$ on $q_1$, $\langle a,b \rangle$ means that a vector a is multiplied by a vector b, to obtain the orthogonalized vector of $h_2$, $y_2=h_2 \ k_{21}q_1$.

4. Assuming that there is a variable n satisfying $2 \leq n \leq m$, the column vector $h_n$ is orthogonalized and a unit orthogonalized vector $q_n$ is calculated, $$q_n = \frac{h_n + \sum_{j=1}^{n-1} k_{nj} q_j}{\left| h_n + \sum_{j=1}^{n-1} k_{nj} q_j \right|}, k_{nj} = -\langle h_n, q_j \rangle,$$

to obtain the orthogonalized vector of $h_n$, $$y_n = h_n + \sum_{j=1}^{n-1} k_{nj} q_j.$$

5. $q_1\ q_2\ L\ q_m$ are combined into Q matrix:

$$q_i^H q_j = \delta_{ij} = \begin{cases} 0 & i \neq j \\ 1 & i = j \end{cases} \to Q = [\,q_1\ q_2\ L\ q_m\,].$$

6. The orthogonalized vector $y_1$ is rewritten to obtain $h_1 = q_1 |y_1|$.

7. The orthogonalized vector $y_2$ is rewritten to obtain $h_2 = q_2 |y_2| - k_{21} q_1$.

8. The orthogonalized vector y is rewritten to obtain $$h_n = q_n |y_n| - \sum_{j=1}^{n-1} k_{nj} q_j.$$

9. In conjunction with the formulas in the step 6, 7 and 8, the result of the QR decomposition of the channel matrix H can be expressed as:

$$H = [\,q_1\ q_2\ L\ q_m\,] \begin{bmatrix} |y_1| & -k_{21} & -k_{31} & L & -k_{m1} \\ & |y_2| & -k_{32} & L & -k_{m2} \\ & & |y_n| & L & -k_{mn} \\ & & & O & M \\ & & & & |y_m| \end{bmatrix}$$

$$= QR$$

The method further comprises the following steps:

step 502, initializing variables and data, multiplying the receiving vector y by a Hermitian transpose of a matrix Q after the QR decomposition of the channel matrix H, i.e., $\hat{y} = Q^H y$ and setting the variable $i = N_t$; and step 503, obtaining the candidate constellation points at each level in turn, the process is as follows:

1. The directly restored data of transmitting signals of the $i^{th}$ transmitting antenna is calculated, $$\xi_i = \frac{\hat{y}_i - \sum_{j=i+1}^{N_t} R_{ij} s_j}{R_{ii}}.$$

2. A distance of the restored data from the nearest constellation point is calculated, $d = \xi_i - Q(\xi_i)$, wherein $Q(\xi_i)$ represents performing a hard decision for $\zeta_i$; for example, $\xi_i = 7.2 + 7.5j$, $d = -0.2 + 0.5j$.

3. An auxiliary variable $\phi$ is calculated: $\phi = |\Re(d)| > |\Im(d)|$, wherein $|\cdot|$ means taking an absolute value; for example, $d = -0.2 + 0.5j$, $\phi = 0$.

4. Under the M-QAM modulation, assuming that sets of values of real parts and imaginary parts of the constellation points are $\Re$ set and $\Im$ set respectively. The number $Rn_i = \mathrm{ceil}(\mathrm{sqrt}(M_i))$ of points of the required real parts and the number $In_i = \mathrm{ceil}(\mathrm{sqrt}(M_i))$ of points of the required imaginary parts are calculated. For example, if $M_i = 8$, then $Rn_i 3$, $In_i = 3$.

5. The number $Rn_i$ of the nearest points $[R_0, R_1, \ldots, R_{Rn_i-1}]$ from $\Re(\xi_i)$ and the number $In_i$ of the nearest points $[I_0, I_1, \ldots, I_{In_i-1}]$ from $\Re(\xi_i)$ are calculated. For example, in the 64QAM modulation, $M_i = 8$, $\Re\ \mathrm{set} = [-7\ -5\ -3\ -1\ 1\ 3\ 5\ 7]$, $\Im\ \mathrm{set} = [-7\ -5\ -3\ -1\ 1\ 3\ 5\ 7]$, $\xi_i = -7.2 + 7.5j$, $[R_0, R_1, R_2] = [-7, -5, -3]$ and $[I_0, I_1, I_2] = [7, 5, 3]$.

6. The first enumerated point is calculated: $p_1 = R_0 + j \cdot I_0$, to obtain the nearest point $p_1$ from $\xi_i$; $p_1 = -7 + 7j$ can be obtained according to the analysis in the previous example.

7. The real part of the second enumerated point is calculated: $A = R_0 \cdot (!\phi) + R_1 \cdot \phi$, wherein $!(\cdot)$ represents NOT operation; the imaginary part of the second enumerated point is calculated: $B = I_0 \phi + I_1 \cdot \phi$); the second enumerated point is calculated: $p_2 = A + j \cdot B$; and $A = (-7) \cdot (!0) + (-5) \cdot 0 = -7$, $B = 7 \cdot 0 + 5 \cdot (!0) = 5$ and $p_2 = -7 + 5j$ can be obtained according to the analysis in the example.

8. The real part of the third enumerated point is calculated: $A = R_1 \cdot (!\phi) + R_0 \cdot \phi$; the imaginary part of the third enumerated point is calculated: $B = I_1 \cdot \phi + I_0 \cdot (!\phi)$; the third enumerated point is calculated: $p_3 = A + j \cdot B$; and $p_3 = -5 + 7j$ in above example.

9. The fourth enumerated point is calculated: $p_4 = R_1 + j \cdot I_1$; and $p_4 = -5 + 5j$ in above example.

10. The fifth enumerated point is calculated: $p_5 = R_0 + j \cdot I_2$; and $p_5 = -7 + 3j$ in above example.

11. The sixth enumerated point is calculated: $p_6 = R_1 + j \cdot I_2$; and $p_6 = -5 + 3j$ in above example.

12. The seventh enumerated point is calculated: $p_7 = R_2 + j \cdot I_0$; and $p_7 = -3 + 7j$ in above example.

13. The eighth enumerated point is calculated: $p_8 = R_2 + j \cdot I_1$; and $p_8 = -3 + 5j$ in above example.

The method further comprises the following steps:
step 504, calculating Euclid increment $$\|e(s_i)\|^2 = \left\| \hat{y}_i - \sum_{j=i}^{N_t} R_{ij} s_j \right\|^2$$

of points enumerated in the step 503 and calculating increments of Euclid distances under $M_i$ different paths;

step 505, setting $i = i - 1$;

step 506, determining whether i equals 1, proceeding to step 507 if i equals 1 and proceeding to step 503 if i is greater than 1. The calculation is performed for each newly added branch;

step 507, calculating the sum of distance errors of all branches according to the increments of Euclid distances;

step 508, determinating whether to perform the soft decision output, performing step 509 if yes and performing step 510 if no;

step 509, if the soft decision output is performed, obtaining soft information as output by the likelihood ratio calculation according to a sequence of candidate constellation points and the sum of the corresponding increments of Euclid distances; and step 510, if the hard decision output is performed, taking directly the sequence of candidate constellation points, in which the increment of Euclid distance is the minimum, as output.

In summary, according to the technique scheme of the embodiments of the present document, by setting the vector $M=[M_1, M_2, \ldots, M_{N_t}]$, the number of the constellation points reserved at each level of transmitting antennas is fixed, and the process of selecting the constellation points of the transmitting antennas does not include the selection-decision process such as if-then. Therefore, processing delay of each path is consistent and is suitable for parallel calculation. The process of selecting the constellation points of each transmitting antenna of the embodiments of the present document is performed only by simple operations such as looking for the nearest points from the real parts and imaginary parts, enumerating, etc., therefore the complexity of calculation is very low. Compared with the SSFE algorithm, values of the real parts and imaginary parts are not required to be calculated during the enumeration process, further decreasing the amount of calculation. In addition, all the constellation points enumerated in the embodiments of the present document are located inside the constellation drawing, avoiding the phenomenon of the enumerated points exceeding the constellation which may occur in the SSFE algorithm. The technology scheme of the embodiments of the present document reduces error propagation and improves detection performance.

Figure 6:
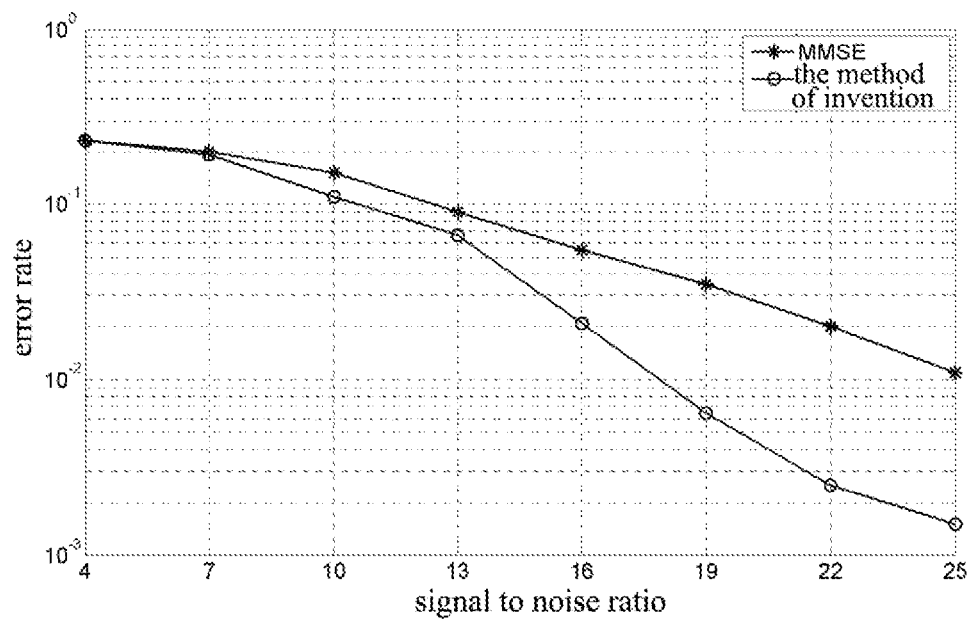
FIG. 6 is a performance simulation comparison chart of the processing method for performing space-time decoding on MIMO signals and the conventional minimum mean square error (MMSE) equilibrium method in accordance with an embodiment of the present document.

FIG. 6 is a performance simulation comparison chart of the processing method for performing space-time decoding on MIMO signals and the conventional minimum mean square error (MMSE) equilibrium method in accordance with an embodiment of the present document, in which a simulation condition and parameters are set as follows: 4-transmitting-4-receiving MIMO-OFDM system, typical city 6 path channel (TU06), 5 Hz of maximum Doppler frequency shift, 16-QAM modulation mode, and parameter M=[1 2 4 8]. Obviously, the method proposed in the embodiment of the present document is significantly better than the MMSE method.

Apparatus Embodiment

Figure 7:
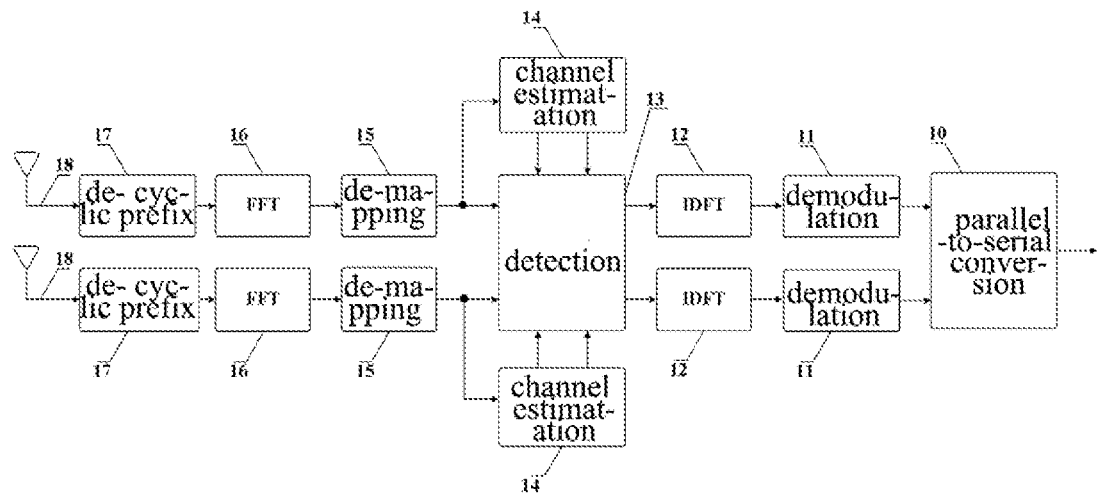
FIG. 7 is a structural schematic drawing of a receiver in accordance with an embodiment of the present document.

As shown in FIG. 7, a structural schematic drawing of a typical receiver in accordance with an embodiment of the present document is provided. The receiver comprises a receiving antenna 18, a de-CP module 17, a FFT module 16, a de-mapping module 15, a channel estimation module 14, a MIMO detection module 13, an IDFT module 12, a demodulation module 11 and a parallel-to-serial conversion module 10.

At a receiving end, a frequency conversion operation (which is achieved by the module 18, in which 18 represents an inverse process corresponding to module 8, and the remaining numbers are similar thereto) is performed first. A receiving antenna performs de-CP by using the module 17, transforming into frequency domain by FFT using the module 16, performing a de-mapping operation in the frequency domain by using the module 15 to obtain transmitting signals influenced by a fading channel and noise, which are still two separate transmitting signals at this point. Afterwards the receiver performs channel estimation on data symbols by using module 14 and then performs an MIMO detection operation by using the module 13 (wherein 14, 13 correspond to module 4 in the FIG. 1), and then it transforms the separated signals respectively by IDFT, performs a demodulation operation by using the module 11 to obtain transmitting data of each antenna and finally performs a parallel-to-serial conversion on the transmitting data by using the module 10.

Figure 8:
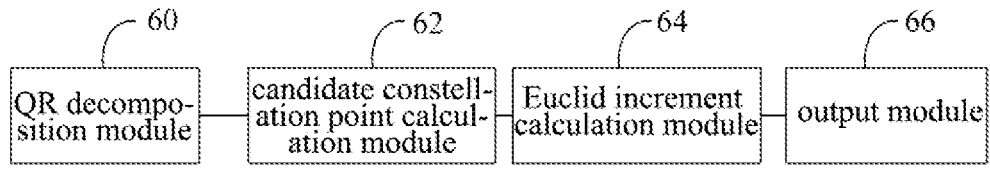
FIG. 8 is a structural schematic drawing of a processing apparatus for performing space-time decoding on MIMO signals in accordance with an embodiment of the present document.

According to the embodiment of the present document, a processing apparatus for performing space-time decoding on MIMO signals is provided for the MIMO detection module 13 in the structure of receiver in FIG. 7. FIG. 8 is a structural schematic drawing of a processing apparatus for performing space-time decoding on MIMO signals in accordance with an embodiment of the present document. As shown in FIG. 8, the processing apparatus for performing space-time decoding on MIMO signals in accordance with an embodiment of the present document comprises a QR decomposition module 60, a candidate constellation point calculation module 62, a Euclid increment calculation module 64 and an output module 66. Each module of the embodiment of the present document will be described in detail below.

The QR decomposition module 60 is configured to perform QR decomposition on a channel matrix H with a matrix size of $N_r \times N_t$ in a MIMO system and perform an initialization operation, wherein $N_t$ is the number of transmitting antennas and $N_r$ is the number of receiving antennas.

The QR decomposition module 60 is configured to:

perform QR decomposition on the channel matrix H according to formula 6:

$$H = Q \times R \qquad \text{formula 6,}$$

wherein Q represents an orthogonal matrix after the QR decomposition of the channel matrix H and R represents an upper triangular matrix after the QR decomposition of the channel matrix H;

multiply a receiving signal y by a Hermitian transpose of the matrix Q after the QR decomposition of the channel matrix H, i.e., $\hat{y} = Q^H y$, wherein $Q^H$ represents Hermitian conjugate of the matrix Q; and set $i = N_t$.

The candidate constellation point calculation module 62 is configured to enumerate candidate constellation points of transmitting signals at each level of transmitting antennas according to an input parameter $M=[M_1, M_2, \ldots, M_{N_t}]$, a receiving signal y and a result of the QR decomposition of the channel matrix H, wherein M is the number of the numerated candidate constellation points at each level, the receiving signal is $y = Hs + n$, wherein H is the channel matrix with the matrix size of $N_r \times N_t$, s is a transmitting signal with a matrix size of $N_t \times 1$, n is white gaussian noise with a matrix size of $N_r \times 1$.

The candidate constellation point calculation module 62 is configured to:

calculate the directly restored data of transmitting signals of the $i(1, 2, \ldots, N_t)^{th}$ transmitting antenna according to formula 7:

$$\xi_i = \frac{\hat{y}_i - \sum_{j=i+1}^{N_t} R_{ij} s_j}{R_{ii}}, \qquad \text{formula 7}$$

wherein $\hat{y}_i$ represents the element of the vector $\hat{y}$, $R_{ij}$ represents data in the $i^{th}$ row and the $j^{th}$ column of the matrix R after the QR decomposition of the channel matrix H, and $s_j$ represents the detected transmitting signal of the $j^{th}$ transmitting antenna;

calculate a distance of the restored data from the nearest candidate constellation point according to formula 8:

$$d = \xi_i - Q(\xi_i) \qquad \text{formula 8,}$$

wherein $Q(\xi_i)$ represents performing a hard decision for $\xi_i$;

calculate an auxiliary variable $\phi$ according to formula 9:

$$\phi = |\Re(d)| > |\Im(d)| \qquad \text{formula 9,}$$

wherein $\Re()$ represents taking real part operation, and $\Im()$ represents taking imaginary part operation; and calculate the number $Rn_i = \text{ceil}(\text{sqrt}(M_i))$ of points of the required real parts and the number $In_i = \text{ceil}(\text{sqrt}(M_i))$ of points of the required imaginary parts;

calculate the number $Rn_i$ of the nearest points from $\Re(\xi_i)$ in a set $\Re$ set and calculating the number $In_i$ of the nearest points from $\Im(\xi_i)$ in a set $\Im$ set, wherein $\Re$ set is a set of values of the real parts of the candidate constellation points and $\Im$ set is a set of values of the imaginary parts of the candidate constellation points; and calculate the candidate constellation points $p_i(1, 2, \ldots, M_i)$ in the transmitting antennas at each level according to a principle of gradual increase of the Euclid distance and according to $Rn_i$, $In_i$ and the auxiliary variable $\phi$.

FIG. 2 is a schematic diagram of search of overall candidate constellation points in accordance with an embodiment of the present document. As shown in FIG. 2, assuming that there are $N_t$ transmitting antennas, the search is started from the $N_t^{th}$ transmitting antennas, one vector $M = [M_1, M_1, \ldots, M_{N_t}]$ is set, and only $M_i$ most possible constellation points are reserved by the $i^{th}$ transmitting antenna.

The Euclid increment calculation module 64 is configured to calculate increments of a Euclid distance due to addition of selection of a candidate constellation point at present level according to the obtained candidate constellation points.

The Euclid increment calculation module 64 is configured to:

set $s_i$ to be respectively equal to each point in the candidate constellation points $p_i(1, 2, \ldots, M_i)$ detected by the $i^{th}$ transmitting antenna, and calculate Euclid distances under $M_i$ different paths according to formula 10:

$$\|e(s_i)\|^2 = \left\|\hat{y}_i - \sum_{j=i}^{N_t} R_{ij}s_j\right\|^2; \qquad \text{formula 10}$$

and determine whether i equals 1, and if yes, invoke the output module 66; if not, set $i = i - 1$ and invoke the candidate constellation point calculation module 62.

FIG. 3 is a schematic diagram of fast enumeration when the constellation points of each transmitting antenna are far away from the edge of a constellation drawing in step 103 in accordance with an embodiment of the present document. As shown in FIG. 3, under 64QAM, when $\xi_i = -2.7 + 2.2j$, the search results obtained by the fast enumeration algorithm of the embodiment of the present document are $p_1 = -3 + 3j$; $p_2 = -3 + 1j$; $p_3 = -1 + 3j$; $p_4 = -1 + 1j$; $p_5 = -3 + 5j$; $p_6 = -1 + 5j$; $p_7 = -5 + 3j$; $p_8 = -5 + 1j$.

FIG. 4 is a schematic diagram of fast enumeration when the constellation points of each transmitting antenna are on the edge of the constellation drawing in step 103 in accordance with an embodiment of the present document. As shown in FIG. 4, under 64QAM, when $\xi_i = -7.2 + 7.5j$, the search results obtained by the fast enumeration algorithm of the embodiment of the present document are $p_1 = -7 + 7j$; $p_2 = -7 + 5j$; $p_3 = -5 + 7j$; $p_4 = -5 + 5j$; $p_5 = -7 + 3j$; $p_6 = -5 + 3j$; $p_8 = -3 + 5j$.

The output module 66 is configured to decide and output space-time decoding according to the sum of the calculated increments of Euclid distances of candidate constellation points at each level.

The output module 66 comprises:

a determining sub-module configured to determine whether a hard decision mode or a soft decision mode is used, invoke a hard decision outputting sub-module if the hard decision mode is determined to be used and invoke a log-likelihood ratio calculation sub-module if the soft decision mode is determined to be used;

the hard decision outputting sub-module configured to select directly a path that minimizes $$\sum_{i=1}^{N_t} \|e(s_i)\|^2$$

as a decision output; and the log-likelihood ratio calculation sub-module configured to perform log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and use the result of the calculation as the decision output.

It is noted that the transmitting signals are modulated by using a mode of multi-level Quadrature Amplitude Modulation (M-QAM) in the embodiments of the present document.

The technical scheme of the embodiments of the present document will be described in detail in conjunction with the accompanying drawings below.

Figure 9:
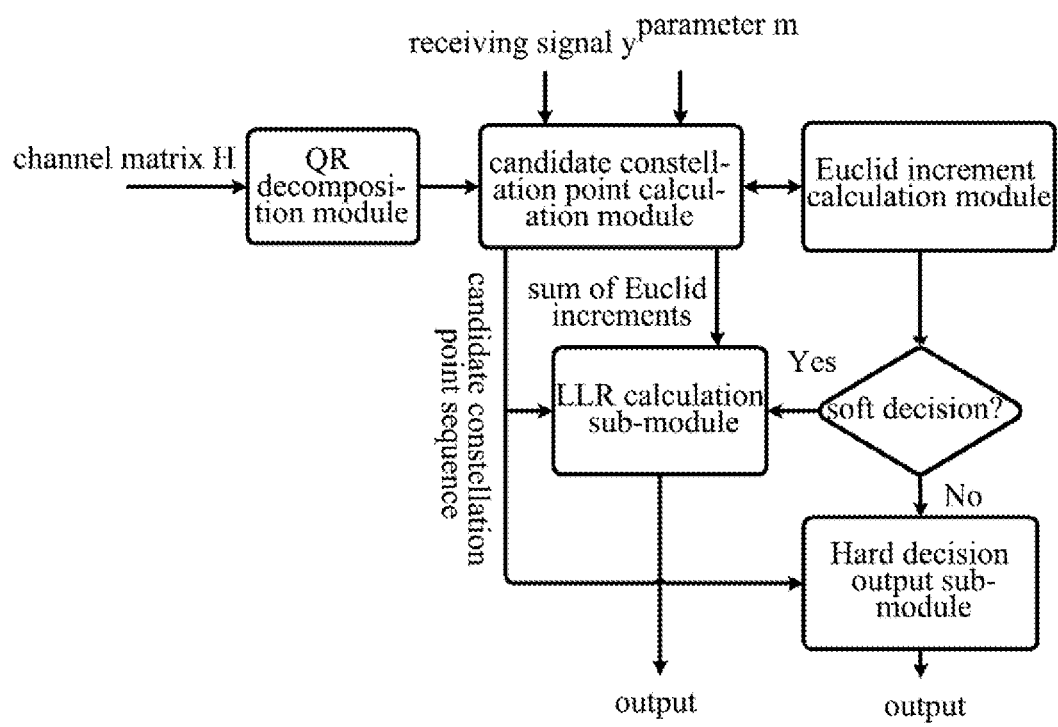
FIG. 9 is a detailed structural schematic drawing of a processing apparatus for performing space-time decoding on MIMO signals in accordance with an embodiment of the present document.

FIG. 9 is a detailed structural schematic drawing of a processing apparatus for performing space-time decoding on MIMO signals in accordance with an embodiment of the present document. As shown in FIG. 9, the apparatus comprises:

a QR decomposition module 60 configured to perform QR decomposition on a channel matrix H to obtain Q matrix and R matrix;

a candidate constellation point calculation module 62 configured to enumerate the required constellation points p according to an input parameter $M = [M_1, M_2, \ldots, M_{N_t}]$, a receiving signal y and a result of the QR decomposition of the channel matrix H, wherein M is the number of the numerated constellation points at each level; and an Euclid increment calculation module 64 configured to calculate increments of a Euclid distance due to addition of selection of a constellation point at present level according to the obtained constellation points p. A log-likelihood ratio LLR calculation sub-module, which is enabled when the required output information is soft information, calculates the soft information according to the sum of the estimated Euclid increments of each group of constellation points. A hard decision outputting sub-module, which is enabled when the required output information is hard decision information, selects a group of constellation points in which the Euclid increment is minimum as an output result of hard decision according to the sum of the estimated Euclid increments of each group of constellation points.

Thereafter on the structure shown in FIG. 9, the technical scheme of the embodiments of the present document will be described in detail in conjunction with FIG. 5. FIG. 5 is a detailed flow chart of a processing method for performing space-time decoding on MIMO signals in accordance with an embodiment of the present document. As shown in FIG. 5, the method comprises the following step:

In step 501, the QR decomposition module 60 performs QR decomposition on a time domain channel matrix H: H=Q×R;

The process of the QR decomposition of the channel matrix H by the QR decomposition module 60 is as follows:

1. The channel matrix H can be expressed as H=[$h_1$ $h_2$ L $h_m$], wherein m=$N_t$, various column vectors are not correlated and can be orthogonalized.

2. The column vector $h_1$ is orthogonalized and a unit orthogonalized vector $q_1$ is calculated, $$q_1 = h_1 / |h_1|,$$

wherein |·| means taking an absolute value, to obtain the orthogonalized vector of $h_1$, $y_1 = h_1 = |h_1| \cdot q_1$.

3. The column vector $h_2$ is orthogonalized and a unit orthogonalized vector $q_2$ is calculated, $$q_2 = \frac{h_2 + k_{21} q_1}{|h_2 + k_{21} q_1|},$$

$$k_{21} = -\langle h_2, q_1 \rangle,$$

wherein $k_{nj}$ represents the projection of $h_n$ on $q_j$, $k_{21}$ represents the projection of $h_2$ on $q_1$, $\langle a,b \rangle$ means that a vector a is multiplied by a vector b, to obtain the orthogonalized vector of $h_2$, $y_2 = h_2 + k_{21} q_1$.

4. Assuming that there is a variable n satisfying 2≤n≤m, the column vector $h_n$ is orthogonalized and a unit orthogonalized vector $q_n$ is calculated, $$q_n = \frac{h_n + \sum_{j=1}^{n-1} k_{nj} q_j}{\left| h_n + \sum_{j=1}^{n-1} k_{nj} q_j \right|},$$

$$k_{nj} = -\langle h_n, q_j \rangle,$$

to obtain the orthogonalized vector of $h_n$, $$y_n = h_n + \sum_{j=1}^{n-1} k_{nj} q_j.$$

5. $q_1$ $q_2$ L $q_m$ are combined into Q matrix:

$$q_i^H q_j = \delta_{ij} = \begin{cases} 0 & i \neq j \\ 1 & i = j \end{cases} \rightarrow Q = [q_1 \ q_2 \ L \ q_m].$$

6. The orthogonalized vector $y_1$ is rewritten to obtain $h_1 = q_1 |y_1|$.

7. The orthogonalized vector $y_2$ is rewritten to obtain $h_2 = q_2 |y_2| - k_{21} q_1$.

8. The orthogonalized vector $y_n$ is rewritten to obtain $$h_n = q_n |y_n| - \sum_{j=1}^{n-1} k_{nj} q_j.$$

9. In conjunction with the formulas in the step 6, 7 and 8, the result of the QR decomposition of the channel matrix H can be expressed as:

$$H = [q_1 \ q_2 \ L \ q_m] \begin{bmatrix} |y_1| & -k_{21} & -k_{31} & L & -k_{m1} \\ & |y_2| & -k_{32} & L & -k_{m2} \\ & & |y_n| & L & -k_{mn} \\ & & & O & M \\ & & & & |y_m| \end{bmatrix}$$

$$= QR$$

The method further comprises the following steps:

step 502, initializing variables and data, multiplying the receiving vector y by a Hermitian transpose of a matrix Q after the QR decomposition of the channel matrix H, i.e., $\hat{y} = Q^H y$ and setting the variable i=$N_t$; and step 503, the candidate constellation point calculation module 62 obtaining the candidate constellation points at each level in turn, the process is as follows:

1. The directly restored data of transmitting signals of the $i^{th}$ transmitting antenna is calculated, $$\xi_i = \frac{\hat{y}_i - \sum_{j=i+1}^{N_t} R_{ij} s_j}{R_{ii}}.$$

2. A distance of the restored data from the nearest constellation point is calculated, d=$\xi_i$−Q($\xi_i$), wherein Q($\xi_i$) represents performing a hard decision for $\xi_i$; for example, $\xi_i$=−7.2+7.5j, d=−0.2+0.5j.

3. An auxiliary variable φ is calculated: φ=|ℜ(d)|>|ℑ(d)|, wherein |·| means taking an absolute value; for example, d=−0.2+0.5j, φ=0.

4. Under the M-QAM modulation, assuming that sets of values of real parts and imaginary parts of the constellation points are ℜ set and ℑ set respectively. The number Rn$_i$=ceil(sqrt($M_i$)) of points of the required real parts and the number In$_i$=ceil(sqrt($M_i$)) of points of the required imaginary parts are calculated. For example, if $M_i$=8, then Rn$_i$=3, In$_i$=3.

5. The number Rn$_i$ of the nearest points [$R_0$, $R_1$, . . . , $R_{Rn_i-1}$] from ℜ($\xi_i$) and the number In$_i$ of the nearest points [$I_0$, $I_1$, . . . , $I_{In_i-1}$] from ℑ($\xi_i$) are calculated. For example, in the 64QAM modulation, $M_i$=8, ℜ set=[−7 −5 −3 −1 1 3 5 7], ℑ set=[−7 −5 −3 −1 1 3 5 7], $\xi_i$=−7.2+7.5j, [$R_0$, $R_1$, $R_2$]=[−7, −5, −3] and [$I_0$, $I_1$, $I_2$]=[7, 5, 3].

6. The first enumerated point is calculated: $p_1$=$R_0$+j·$I_0$, to obtain the nearest point $p_1$ from $\xi_i$; $p_1$=−7+7j can be obtained according to the analysis in the previous example.

7. The real part of the second enumerated point is calculated: A=$R_0$·(!φ)+$R_1$·φ, wherein !(·) represents NOT operation; the imaginary part of the second enumerated point is calculated: $B=I_0 \phi + I_1 \cdot (!\phi)$; the second enumerated point is calculated: $p_2 = A + j \cdot B$; and $A=(-7) \cdot (!\phi) + (-5) \cdot 0 = -7$, $B = 7 \cdot 0 + 5 \cdot (!0) = 5$ and $p_2 = -7 + 5j$ can be obtained according to the analysis in the example.

8. The real part of the third enumerated point is calculated: $A = R_1 \cdot (!\phi) + R_0 \cdot \phi$; the imaginary part of the third enumerated point is calculated: $B = I_1 \cdot \phi + I_0 \cdot (!\phi)$; the third enumerated point is calculated: $p_3 = A + j \cdot B$; and $p_3 = -5 + 7j$ in above example.

9. The fourth enumerated point is calculated: $p_4 = R_1 + j \cdot I_1$; and $p_4 = -5 + 5j$ in above example.

10. The fifth enumerated point is calculated: $p_5 = R_0 + j \cdot I_2$; and $p_5 = -7 + 3j$ in above example.

11. The sixth enumerated point is calculated: $p_6 = R_1 + j \cdot I_2$; and $p_6 = -5 + 3j$ in above example.

12. The seventh enumerated point is calculated: $p_7 = R_2 + j \cdot I_0$; and $p_7 = -3 + 7j$ in above example.

13. The eighth enumerated point is calculated: $p_8 = R_2 + j \cdot I_1$; and $p_8 = -3 + 5j$ in above example.

The method further comprises the following steps:

step 504, the Euclid increment calculation module 64 calculating Euclid increment $$\|e(s_i)\|^2 = \left\| \hat{y}_i - \sum_{j=i}^{N_t} R_{ij} s_j \right\|^2$$

of points enumerated in the step 503 and calculating increments of Euclid distances under $M_i$ different paths;

step 505, setting $i=i-1$;

step 506, determining whether i equals 1, proceeding to step 507 if i equals 1 and proceeding to step 503 if i is greater than 1. The calculation is performed for each newly added branch;

step 507, calculating the sum of distance errors of all branches according to the increments of Euclid distances;

step 508, determinating whether to perform the soft decision output, performing step 509 if yes and performing step 510 if no;

step 509, if the soft decision output is performed, the LLR calculation sub-module obtains soft information as output through the likelihood ratio calculation according to a sequence of candidate constellation points and the sum of the corresponding increments of Euclid distances; and step 510, if the hard decision output is performed, the LLR calculation sub-module directly take the sequence of candidate constellation points, in which the increment of Euclid distance is the minimum, as output.

In summary, according to the technique scheme of the embodiments of the present document, by setting the vector $M=[M_1, M_2, \ldots, M_{N_t}]$, the number of the constellation points reserved at each level of transmitting antennas is fixed, and the process of selecting the constellation points of the transmitting antennas does not include the selection-decision process such as if-then. Therefore, processing delay of each path is consistent and is suitable for parallel calculation. The process of selecting the constellation points of each transmitting antenna of the embodiments of the present document is performed only by simple operations such as looking for the nearest points from the real parts and imaginary parts, enumerating, etc., therefore the complexity of calculation is very low. Compared with the SSFE algorithm, values of the real parts and imaginary parts are not required to be calculated during the enumeration process, further decreasing the amount of calculation. In addition, all the constellation points enumerated in the embodiments of the present document are located inside the constellation drawing, avoiding the phenomenon of the enumerated points exceeding the constellation which may occur in the SSFE algorithm. The technology scheme of the embodiments of the present document reduces error propagation and improves detection performance.

Although the preferred embodiments of the present document are disclosed for illustrative purpose, those skilled in the art will recognize that various improvements, additions and substitutions are possible. Therefore, the scope of the present document is not limited to the embodiments described above.

It should be noted that in all components of controllers of the embodiments of the present document, the components therein are divided logically according to their functions to be implemented. However, the embodiments of the present document are not limited thereto. Each component can be redivided or recombined as desired. For example, some of the components may be combined into a single component or some of the components may be sub-divided into more sub-components.

Each example of the components of the embodiments of the present document may be implemented in hardware or in software module running on one or more processors or combination thereof. It is should be understood by those skilled in the art that in practice some or all of functions of some or all of the components in the controllers in accordance with the embodiments of the present document may be implemented by using a microcontroller or a digital signal processor (DSP). A portion or all of device or apparatus program (e.g., computer program and computer program product) for executing the methods described herein may be implemented in the embodiments of the present document. Such program for implementing the embodiments of the present document may be stored on computer readable media or have a form of one or more signals. Such signals may be downloaded from Internet websites or provided on carrier signals or provided in any other form.

It should be noted that the embodiments described above illustrate the present document and not to limit the present document. Moreover, replacement embodiments may be designed by those skilled in the art without departing from the scope of the appended claims. In the claims, any reference character inside brackets should not be construed as limitation to the claims. The word "comprise" does not exclude elements or steps which are not listed in the claims. The word "a" or "one" preceding to an element does not exclude a plurality of such elements. The embodiments of the present document can be implemented by means of hardware containing a number of different elements or by means of suitably programmed computers. In a unit claim in which a number of apparatuses are listed, some of the apparatuses may be implemented by the same hardware item. The use of the words "the first", "the second" and "the third" does not implies any order and may be construed as name.

INDUSTRIAL APPLICABILITY

By setting the vector $M=[M_1, M_2, \ldots, M_{N_t}]$, the number of the constellation points reserved at each level of transmitting antennas is fixed, and the process of selecting the constellation points of the transmitting antennas does not include the selection-decision process such as if-then. Therefore, processing delay of each path is consistent and is suitable for parallel calculation. The process of selecting the constellation points of each transmitting antenna of the embodiments of the present document is performed only by simple operations such as looking for the nearest points from the real parts and imaginary parts, enumerating, etc., therefore the complexity of calculation is very low. Compared with the SSFE algorithm, values of the real parts and imaginary parts are not required to be calculated during the enumeration process, further decreasing the amount of calculation. In addition, all the constellation points enumerated in the embodiments of the present document are located inside the constellation drawing, avoiding the phenomenon of the enumerated points exceeding the constellation which may occur in the SSFE algorithm. The technology scheme of the embodiments of the present document reduces error propagation and improves detection performance.

What we claim is:

1. A processing method for performing space-time decoding on MIMO signals comprising:

step 1, performing QR decomposition on a channel matrix H with a matrix size of $N_r \times N_t$ in a MIMO system and performing an initialization operation, wherein $N_t$ is the number of transmitting antennas and $N_r$ is the number of receiving antennas;

step 2, enumerating candidate constellation points of transmitting signals at each level of transmitting antennas according to an input parameter $M=[M_1, M_2, \ldots, M_{N_t}]$, a receiving signal y and a result of QR decomposition of the channel matrix H, wherein M is the number of the enumerated candidate constellation points at each level, the receiving signal y=Hs+n, wherein H is the channel matrix with the matrix size of $N_r \times N_t$, s is a transmitting signal with a matrix size of $N_t \times 1$, n is white gaussian noise with a matrix size of $N_r \times 1$;

step 3, calculating an increment of a Euclid distance due to addition of selection of candidate constellation points at present level according to the obtained candidate constellation points; and step 4, deciding and outputting space-time decoding according to the sum of the calculated increments of Euclid distances of candidate constellation points at each level.

2. The method according to claim 1, wherein the step 1 comprises:

step 11, performing QR decomposition on the channel matrix H according to formula 1:

$$H = Q \times R \qquad \text{formula 1,}$$

wherein Q represents an orthogonal matrix after the QR decomposition of the channel matrix H and R represents an upper triangular matrix after the QR decomposition of the channel matrix H;

step 12, multiplying the receiving signal y by a Hermitian transpose of the matrix Q after the QR decomposition of the channel matrix H: $\hat{y} = Q^H y$, wherein $Q^H$ represents a Hermitian conjugate of the matrix Q; and step 13, setting $i=N_t$.

3. The method according to claim 2, wherein the transmitting signals are modulated by using a mode of multi-level Quadrature Amplitude Modulation (M-QAM).

4. The method according to claim 2, wherein the step 2 comprises:

step 21, calculating directly restored data of transmitting signals of the $i(1, 2, \ldots, N_t)^{th}$ transmitting antenna according to formula 2:

$$\xi_i = \frac{\hat{y}_i - \sum_{j=i+1}^{N_t} R_{ij} s_j}{R_{ii}}, \qquad \text{formula 2}$$

wherein $\hat{y}_i$ represents a $i^{th}$ element of a vector $\hat{y}$, $R_{ij}$ represents data in the $i^{th}$ low and the $j^{th}$ column of the matrix R after the QR decomposition of the channel matrix H, and $s_j$ represents detected transmitting signals of the $j^{th}$ transmitting antenna;

step 22, calculating a distance of the restored data from the nearest candidate constellation point according to formula 3:

$$d = \xi_i - Q(\xi_i) \qquad \text{formula 3,}$$

wherein $Q(\xi_i)$ represents performing a hard decision for $\xi_i$;

step 23, calculating an auxiliary variable φ according to formula 4:

$$\phi = |\Re(d)| > |\Im(d)| \qquad \text{formula 4,}$$

wherein $\Re( )$ represents taking real part operation, and $\Im( )$ represents taking imaginary part operation;

step 24, calculating the number $Rn_i=\text{ceil}(\text{sqrt}(M_i))$ of points of required real parts and the number $In_i=\text{ceil}(\text{sqrt}(M_i))$ of points of required imaginary parts;

step 25, calculating the number $Rn_i$ of the nearest points from $\Re(\xi_i)$ in a set $\Re$ set and calculating the number $In_i$ of the nearest points from $\Im(\xi_i)$ in a set $\Im$ set, wherein $\Re$ set is a set of values of real parts of candidate constellation points and $\Im$ set is a set of values of imaginary parts of candidate constellation points; and step 25, calculating candidate constellation points $p_i(1, 2, \ldots, M_i)$ at each level of transmitting antennas according to a principle of gradual increase of Euclid distances and according to $Rn_i$, $In_i$ and the auxiliary variable φ.

5. The method according to claim 4, wherein the transmitting signals are modulated by using a mode of multi-level Quadrature Amplitude Modulation (M-QAM).

6. The method according to claim 4, wherein the step 3 comprises:

step 31, setting $s_i$ to be respectively equal to each point in the candidate constellation points $p_i(1, 2, \ldots, M_i)$ detected by the $i^{th}$ transmitting antenna, and calculating Euclid distances under $M_i$ different paths according to formula 5:

$$\|e(s_i)\|^2 = \left\| \hat{y}_i - \sum_{j=i}^{N_t} R_{ij} s_j \right\|^2 ; \qquad \text{formula 5}$$

and step 32, determining whether i equals 1, and if yes, performing the step 4; if not, setting $i=i-1$ and performing the step 21.

7. The method according to claim 6, wherein the step 4 comprises:

step 41, determining whether a hard decision mode or a soft decision mode is used, performing step 42 if the hard decision mode is determined to be used and performing step 43 if the soft decision mode is determined to be used;

step 42, selecting directly a path that minimizes $$\sum_{i=1}^{N_t} \|e(s_i)\|^2$$

as a decision output; and step 43, performing log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and using a result of calculation as a decision output.

8. The method according to claim 6, wherein the transmitting signals are modulated by using a mode of multi-level Quadrature Amplitude Modulation (M-QAM).

9. The method according to claim 1, wherein the step 4 comprises:
   step 41, determining whether a hard decision mode or a soft decision mode is used, performing step 42 if the hard decision mode is determined to be used and performing step 43 if the soft decision mode is determined to be used;
   step 42, selecting directly a path that minimizes $$\sum_{i=1}^{N_t} \|e(s_i)\|^2$$

as a decision output; and step 43, performing log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and using a result of calculation as a decision output.

10. The method according to claim 9, wherein the transmitting signals are modulated by using a mode of multi-level Quadrature Amplitude Modulation (M-QAM).

11. The method according to claim 1, wherein the transmitting signals are modulated by using a mode of multi-level Quadrature Amplitude Modulation (M-QAM).

12. A processing apparatus for performing space-time decoding on MIMO signals comprising:
   a QR decomposition module configured to perform QR decomposition on a channel matrix H with a matrix size of $N_r \times N_t$ in a MIMO system and perform an initialization operation, wherein $N_t$ is the number of transmitting antennas and $N_r$ is the number of receiving antennas;
   a candidate constellation point calculation module configured to enumerate candidate constellation points of transmitting signals at each level of transmitting antennas according to an input parameter $M=[M_1, M_2, \ldots, M_{N_t}]$, a receiving signal y and a result of the QR decomposition of the channel matrix H, wherein M is the number of the enumerated candidate constellation points at each level, the receiving signal y=Hs+n, wherein H is the channel matrix with the matrix size of $N_r \times N_t$, s is a transmitting signal with a matrix size of $N_t \times 1$, n is white gaussian noise with a matrix size of $N_r \times 1$;
   a Euclid increment calculation module configured to calculate an increment of a Euclid distance due to addition of selection of a candidate constellation point at present level according to the obtained candidate constellation points; and
   an output module configured to decide and output space-time decoding according to the sum of the calculated increments of Euclid distances of candidate constellation points at each level.

13. The apparatus according to claim 12, wherein the QR decomposition module is configured to:
   perform QR decomposition on the channel matrix H according to formula 6:

$$H = Q \times R \qquad \text{formula 6,}$$

wherein Q represents an orthogonal matrix after the QR decomposition of the channel matrix H and R represents an upper triangular matrix after the QR decomposition of the channel matrix H;
   multiply the receiving signal y by a Hermitian transpose of the matrix Q after the QR decomposition of the channel matrix H: $\hat{y} = Q^H y$, wherein $Q^H$ represents a Hermitian conjugate of the matrix Q; and
   set $i = N_t$.

14. The apparatus according to claim 13, wherein the transmitting signals are modulated by using a mode of multi-level Quadrature Amplitude Modulation (M-QAM).

15. The apparatus according to claim 13, wherein the candidate constellation point calculation module is configured to:
   calculate directly restored data of transmitting signals of the $i(1, 2, \ldots, N_t)^{th}$ transmitting antenna according to formula 7:

$$\xi_i = \frac{\hat{y}_i - \sum_{j=i+1}^{N_t} R_{ij} s_j}{R_{ii}}, \qquad \text{formula 7}$$

wherein $\hat{y}_i$ represents a $i^{th}$ element of a vector $\hat{y}$, $R_{ij}$ represents data in the $i^{th}$ low and the $j^{th}$ column of the matrix R after the QR decomposition of the channel matrix H, and $s_j$ represents detected transmitting signals of the $j^{th}$ transmitting antenna;
   calculate a distance of the restored data from the nearest candidate constellation point according to formula 8:

$$d = \xi_i - Q(\xi_i) \qquad \text{formula 8,}$$

wherein $Q(\xi_i)$ represents performing a hard decision for $\zeta_i$;

calculate an auxiliary variable $\phi$ according to formula 9:

$$\phi = |\Re(d)| > |\Im(d)| \quad \text{formula 9,}$$

wherein $\Re(\ )$ represents taking real part operation, and $\Im(\ )$ represents taking imaginary part operation;

calculate the number $Rn_i=\text{ceil}(\text{sqrt}(M_i))$ of points of required real parts and the number $In_i=\text{ceil}(\text{sqrt}(M_i))$ of points of required imaginary parts;

calculate the number $Rn_i$ of the nearest points from $\Re(\xi_i)$ in a set $\Re$ set and calculating the number $In_i$ of the nearest points from $\Im(\xi_i)$ in a set $\Im$ set, wherein $\Re$ set is a set of values of real parts of candidate constellation points and $\Im$ set is a set of values of imaginary parts of candidate constellation points; and calculate candidate constellation points $p_i(1, 2, \ldots, M_i)$ at each level of transmitting antennas according to a principle of gradual increase of Euclid distances and according to $Rn_i$, $In_i$ and the auxiliary variable $\phi$.

16. The apparatus according to claim 15, wherein the transmitting signals are modulated by using a mode of multi-level Quadrature Amplitude Modulation (M-QAM).

17. The apparatus according to claim 15, wherein the Euclid increment calculation module is configured to:

set $s_i$ to be respectively equal to each point in the candidate constellation points $p_i(1, 2, \ldots, M_i)$ detected by the $i^{th}$ transmitting antenna, and calculate Euclid distances under $M_i$ different paths according to formula 10:

$$\|e(s_i)\|^2 = \left\|\hat{y}_i - \sum_{j=i}^{N_t} R_{ij}s_j\right\|^2; \quad \text{formula 10}$$

and determine whether i equals 1, and if yes, invoke the output module; if not, set $i=i-1$ and invoke the candidate constellation point calculation module.

18. The apparatus according to claim 17, wherein the output module comprises:

a determining sub-module configured to determine whether a hard decision mode or a soft decision mode is used, invoke a hard decision outputting sub-module if the hard decision mode is determined to be used and invoke a log-likelihood ratio calculation sub-module if the soft decision mode is determined to be used;

the hard decision outputting sub-module configured to select directly a path that minimizes $$\sum_{i=1}^{N_t} \|e(s_i)\|^2$$

as a decision output; and the log-likelihood ratio calculation sub-module configured to perform a log-likelihood ratio calculation according to constellation points corresponding to the first A paths that minimizes $$\sum_{i=1}^{N_t} \|e(s_i)\|^2$$

and a value of $$\sum_{i=1}^{N_t} \|e(s_i)\|^2,$$

and use a result of calculation as a decision output.

19. The apparatus according to claim 17, wherein the transmitting signals are modulated by using a mode of multi-level Quadrature Amplitude Modulation (M-QAM).

20. The apparatus according to claim 12, wherein the transmitting signals are modulated by using a mode of multi-level Quadrature Amplitude Modulation (M-QAM).

* * * * *